United States Patent
Gorohovski

(10) Patent No.: US 11,710,053 B2
(45) Date of Patent: Jul. 25, 2023

(54) PROVIDING A RECOMMENDATION TO CHANGE AN OUTCOME PREDICTED BY A REGRESSION MODEL

(71) Applicant: LONGSAND LIMITED, Cambridge (GB)

(72) Inventor: Alexander Gorohovski, Yehud (IL)

(73) Assignee: Longsand Limited

( * ) Notice: Subject to any disclaimer, the term of this patent is extended or adjusted under 35 U.S.C. 154(b) by 1100 days.

(21) Appl. No.: 16/070,932

(22) PCT Filed: Jan. 29, 2016

(86) PCT No.: PCT/EP2016/052006
§ 371 (c)(1),
(2) Date: Jul. 18, 2018

(87) PCT Pub. No.: WO2017/129268
PCT Pub. Date: Aug. 3, 2017

(65) Prior Publication Data
US 2019/0026636 A1    Jan. 24, 2019

(51) Int. Cl.
| | |
|---|---|
| *G06N 5/02* | (2023.01) |
| *G06Q 30/02* | (2023.01) |
| *G06N 5/04* | (2023.01) |
| *G06N 20/00* | (2019.01) |
| *G06F 16/242* | (2019.01) |

(Continued)

(52) U.S. Cl.
CPC .............. *G06N 5/04* (2013.01); *G06F 16/242* (2019.01); *G06F 16/2425* (2019.01); *G06F 16/951* (2019.01); *G06N 7/00* (2013.01); *G06N 20/00* (2019.01)

(58) Field of Classification Search
CPC . G06N 5/04; G06N 7/00; G06N 20/00; G06F 16/242; G06F 16/2425
See application file for complete search history.

(56) References Cited

U.S. PATENT DOCUMENTS 8,229,864 B1    7/2012 Lin et al.
8,600,809 B1    12/2013 Kubica (Continued)

OTHER PUBLICATIONS

Van Lint, Reliable Travel Time Prediction for Freeways: Bridging Artificial Neural Networks and Traffic Flow Theory, Doctoral Thesis, Technische Universiteit Delft, 2004, pp. 1-325 (Year: 2004).*

(Continued)

*Primary Examiner* — Brandon S Cole
(74) *Attorney, Agent, or Firm* — Sheridan Ross P.C.

(57) ABSTRACT

A technique includes modifying a first record based on a plurality of training records to provide a plurality of modified records. The plurality of training records are associated with a regression model, and a target outcome is associated with the first record. The technique includes applying the regression model to the plurality of modified records to provide outcomes for the modified records; and selecting a group of the modified records based at least in part on the outcomes for the modified records. The technique includes providing a recommendation for the first record to change an outcome predicted for the first record by the regression model based at least part on the target outcome and the outcomes for the modified records.

20 Claims, 5 Drawing Sheets

(51) Int. Cl.
*G06F 16/951* (2019.01)
*G06N 7/00* (2023.01)

(56) References Cited

U.S. PATENT DOCUMENTS

| | | | |
|---|---|---|---|
| 8,682,819 B2 | 3/2014 | Consul et al. | |
| 2003/0212679 A1 | 11/2003 | Venkayala et al. | |
| 2005/0177414 A1 | 8/2005 | Priogin et al. | |
| 2008/0319829 A1* | 12/2008 | Hunt | G06Q 30/0201 705/7.29 |
| 2009/0138285 A1* | 5/2009 | Denberg | G16H 10/60 707/E17.014 |
| 2009/0210246 A1* | 8/2009 | Patel | G06Q 50/01 705/319 |
| 2014/0012794 A1* | 1/2014 | Dillon | G06N 5/02 706/46 |
| 2014/0229498 A1* | 8/2014 | Dillon | H04L 67/306 707/767 |
| 2014/0258189 A1 | 9/2014 | Schmidt | |
| 2014/0279754 A1 | 9/2014 | Barsoum et al. | |
| 2014/0358825 A1 | 12/2014 | Phillipps et al. | |
| 2015/0127588 A1 | 5/2015 | Lakshmanan | |
| 2016/0026917 A1 | 1/2016 | Weisberg | |
| 2016/0300252 A1* | 10/2016 | Frank | G06F 21/6245 |

OTHER PUBLICATIONS

Lange, Effective and Efficient Similarity Search in Databases, Doctoral Thesis, Universitaet Potsdam, 2013, pp. 1-117 (Year: 2013).* http://www.sciencedirect.com/science/article/pii/S0306457399000333 Author: Mostafaa J. et al. Date: May 1, 2000 Title: Automatic Classification Using Supervised Learning in a Medical Document Filtering Application.

International Searching Authority, "Notification of Transmittal of the International Search Report and the Written Opinion", PCT/EP2016/052006, dated Oct. 26, 2016, 11 pages.

* cited by examiner

| # | PRICE (US $) | LOCATION | ROOMS | FLOORS | SIZE | OUTCOME DISTANCE | RECORD DISTANCE |
|---|---|---|---|---|---|---|---|
| 1 | 203,500 | SUBDIV #10 | 4 | 2 | 1,850 | 3 | 7 |
| 2 | 206,500 | SUBDIV #14 | | | | 5 | 6 |
| | ... | | ... | | ... | | ... |
| N | 219,000 | SUBDIV #5 | 5 | 1 | 2,019 | 21 | 3 |

FIG. 4

PROVIDING A RECOMMENDATION TO CHANGE AN OUTCOME PREDICTED BY A REGRESSION MODEL

BACKGROUND

Machine learning may be used for purposes of predicting a future outcome. Machine learning regression addresses the problem of predicting a continuous value for a given variable conditioned on one or multiple other variable values.

BRIEF DESCRIPTION OF THE DRAWINGS

FIG. 4 is a table illustrating example recommendations provided by the recommendation engine of FIG. 1 according to an example implementation.

DETAILED DESCRIPTION

Figure 1:
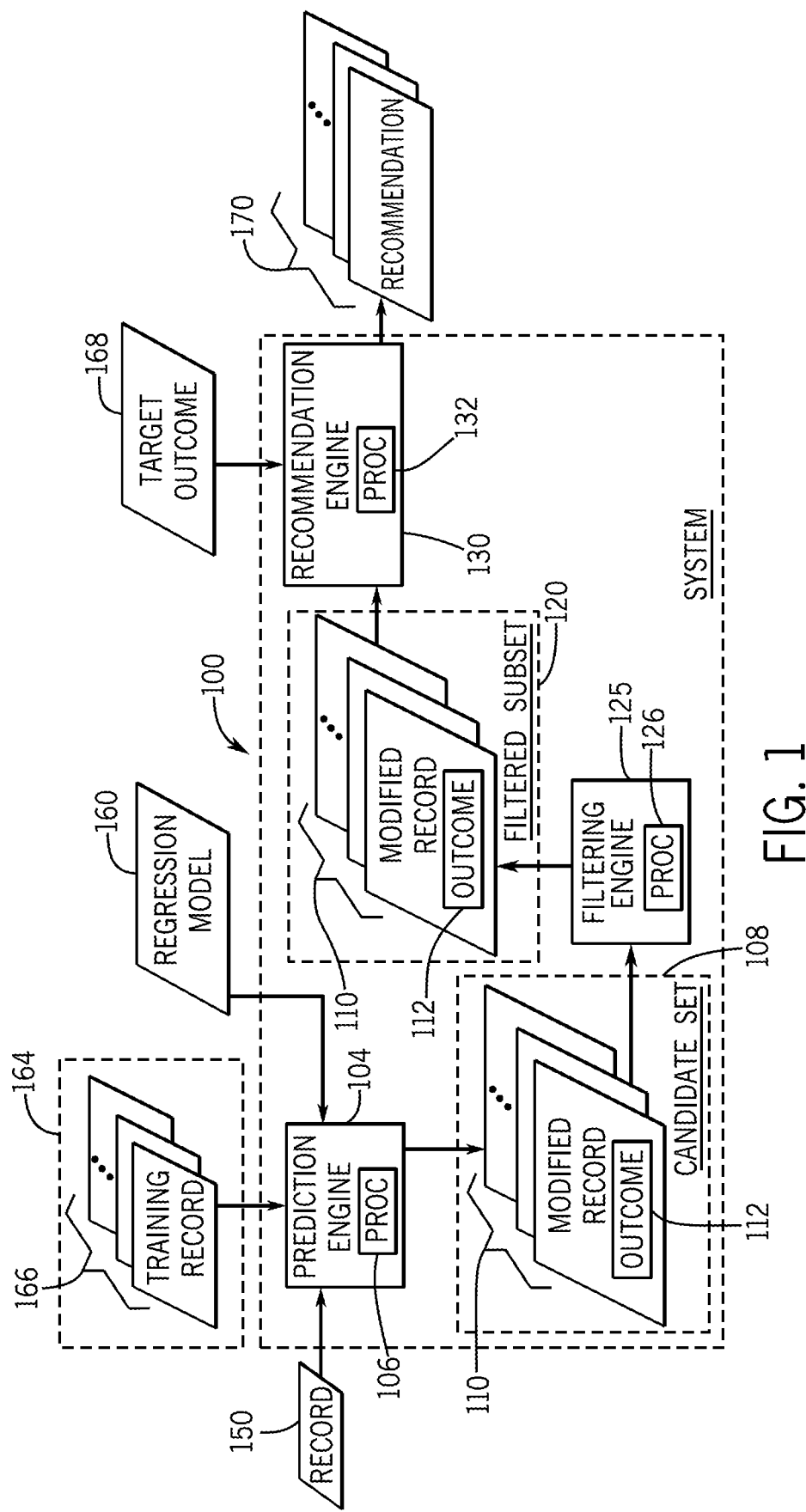
FIG. 1 is a schematic diagram of a system to provide one or multiple recommendations to change an outcome predicted by a regression model according to an example implementation.

In general, regression analysis (linear regression analysis, for example) may be applied to a set of attributes (herein called a "record") to predict a continuous value based on the attributes. In machine learning, a regression model may be trained based on labeled training data (i.e., data producing observed, or labeled, continuous values) for purposes of predicting continuous values. As a more specific example, a regression model to predict house values may be trained with labeled house sales data. Using such a regression model, the regression model may be applied to a set of attributes (a square footage, a location, the number of floors, the year of construction, and so forth) to predict a price (a continuous value) for a house described by these attributes.

A challenge with using such a regression model is that the mere prediction of a value does not provide insight of what attributes affect to be changed, or the extent of how certain attributes affect the value. For example, in a house search, a particular user may use a regression model for purposes of predicting a house price for a given set of attributes. The user may be, for example, a potential home buyer that has a targeted house budgeted price (i.e., a target price accompanied by a range in which the actual price may vary). The user may be willing to change some of the attributes (location, number of bedrooms, and so forth), but the user may be unaware of which attributes to change to derive the desired change, as it may not be readily apparent which parameters can be changed to identify houses in the targeted price range.

Systems and techniques are discussed herein in which recommendations are provided for purposes of changing a continuous value that is predicted by a regression model. In particular, in accordance with example implementations, a system may receive a record that represents various input values that are provided to a regression model, such as parameters associated with a house search, for example. A regression model may be applied to this record for purposes of predicting a continuous value, such as a house price. The continuous value predicted by the regression model may not, however, be close enough to a target outcome for a given user. In accordance with example systems and techniques that are discussed herein, the original record is modified based on the training records (i.e., labeled data) that are used to train the regression model, and the regression model is applied to these modified training records to predict corresponding outcomes. The outcomes are compared to a target outcome, and based on these comparisons, one or multiple modified training records are identified and presented to the user. Accordingly, the user is provided recommendations for changing the outcome of the original record to provide a result that is close enough (within a predetermined range, as further described herein) to the target outcome.

In accordance with example implementations, a "target outcome" refers to a given target value and an associated error range. For example, for the case of predicting the price or value of a house, the target outcome may, in general, refer to a fixed price, in association with a range (a range of ±5 percent, for example) about the price point.

As a more specific example, FIG. 1 depicts a system 100 in accordance with example implementations. In general, the system 100 includes a prediction engine 104, which receives a record 150 describing a set of attributes. A regression model 160, when applied to the attributes described by the record 150, may predict an outcome for the record 150. However, the predicted outcome may not be suitable, when compared to a target outcome 168. As such, the system 100 provides one or multiple recommendations 170 for purposes of guiding modification of the record 150 to produce a result within the target outcome 168.

More specifically, in accordance with example implementations, the prediction engine 104 accesses (reads data from a memory, for example) a set 164 of one or multiple training records 166. In this regard, a given training record 166 corresponds to labeled training data and describes a set of attributes having a known outcome (i.e., an outcome that has been observed). The regression model 160 is trained against the training records 166 of the set 164. The prediction engine 104 modifies the training records 166 of the set 164 to produce a candidate set 108 of modified records 110. In this manner, in accordance with example implementations, a modified record 110 is derived from a combination of the record 150 and one of the training records 166 of the set 164. The record 150 may have one or multiple attributes that are "modifiable" and one or more attributes that are not modifiable. More specifically, a modifiable attribute refers to an attribute that may be changed for purposes of steering the outcome toward the target outcome 168. For the case of house values or prices, a record 150 may represent such attributes as house location and number of rooms, but, as an example, the number of floors may not be modifiable/adjustable. For example, for the particular application, a house search may be performed by an elderly person who does not desire a house with more than one floor. As another example, the record 150 may represent attributes used by a user for purposes of searching for a certain salary (relating to employment). As such, the record may have such modifiable attributes as a level of education or a job location. However, attributes, such as gender, ethnicity, and so forth may not be modifiable.

In accordance with example implementations, the prediction engine 104 constructs a given modified record 110 by combining the non-modifiable attributes from the record 150 with the modifiable attributes from a given training record 166.

Not all of the modified records 110 of the candidate set 108 may, in accordance with some implementations, be suitable to produce an outcome that satisfies the target outcome 168. As such, the system 100 may include a filtering engine 125, which filters the modified records 110 of the candidate set 108 to produce a filtered subset 120 of the modified records 110. The outcomes 112 of the modified records 110 of the filtered subset 120 are consistent with the target outcome 168. However, some of the modified records 110 of the filtered subset 120 produce outcomes that are better or closer to the target outcome than others.

In accordance with example implementations, a recommendation engine 130 of the system 100 ranks the modified records 110 of the filtered subset 120 to produce one or multiple recommendations 170. In accordance with some implementations, the recommendations 170 are a ranked list of the modified records 110, detailing the changes for producing the closest match to the target value.

Among its other features, in accordance with some implementations, the prediction engine 104, the filtering engine 125 and the recommendation engine 130 may include hardware processors 106, 126 and 132, respectively. Moreover, as further described herein, in accordance with example implementations, the system 100 may receive various other user inputs, such as the number of top results to provide as the recommendations 170, a designation of which attributes are modifiable, and so forth.

Figure 2:
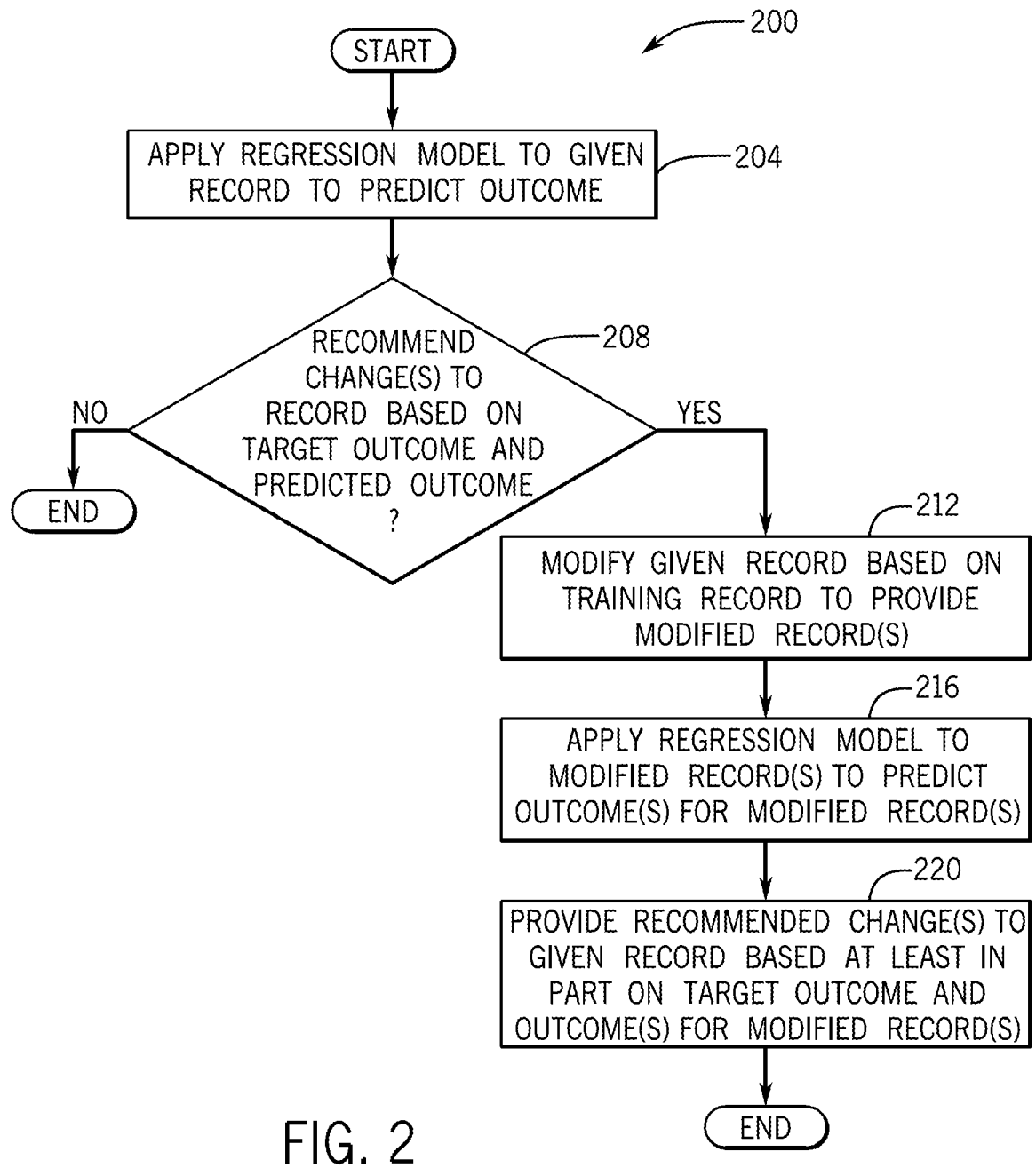
FIGS. 2 and 3 are flow diagrams depicting techniques to provide one or multiple recommendations to change an outcome predicted by a regression model according to example implementations.

Thus, referring to FIG. 2, in accordance with example implementations, a technique 200 includes applying (block 204) a regression model to a given record to predict an outcome and based at least in part on the application of the regression model, a determination is made (decision block 208) whether to recommend changes to the record based on the target outcome and the predicted outcome. If so, pursuant to the technique 200, the given record is modified (block 212) based on one or multiple training records to provide one or multiple modified records. Pursuant to the technique 200, the regression model may then be applied to the modified record(s) to predict one or multiple outcomes for the modified record(s) pursuant to block 216. One or multiple recommendations may then be provided (block 220) based at least in part on a target outcome and the outcome(s) for the modified record(s).

Figure 3:
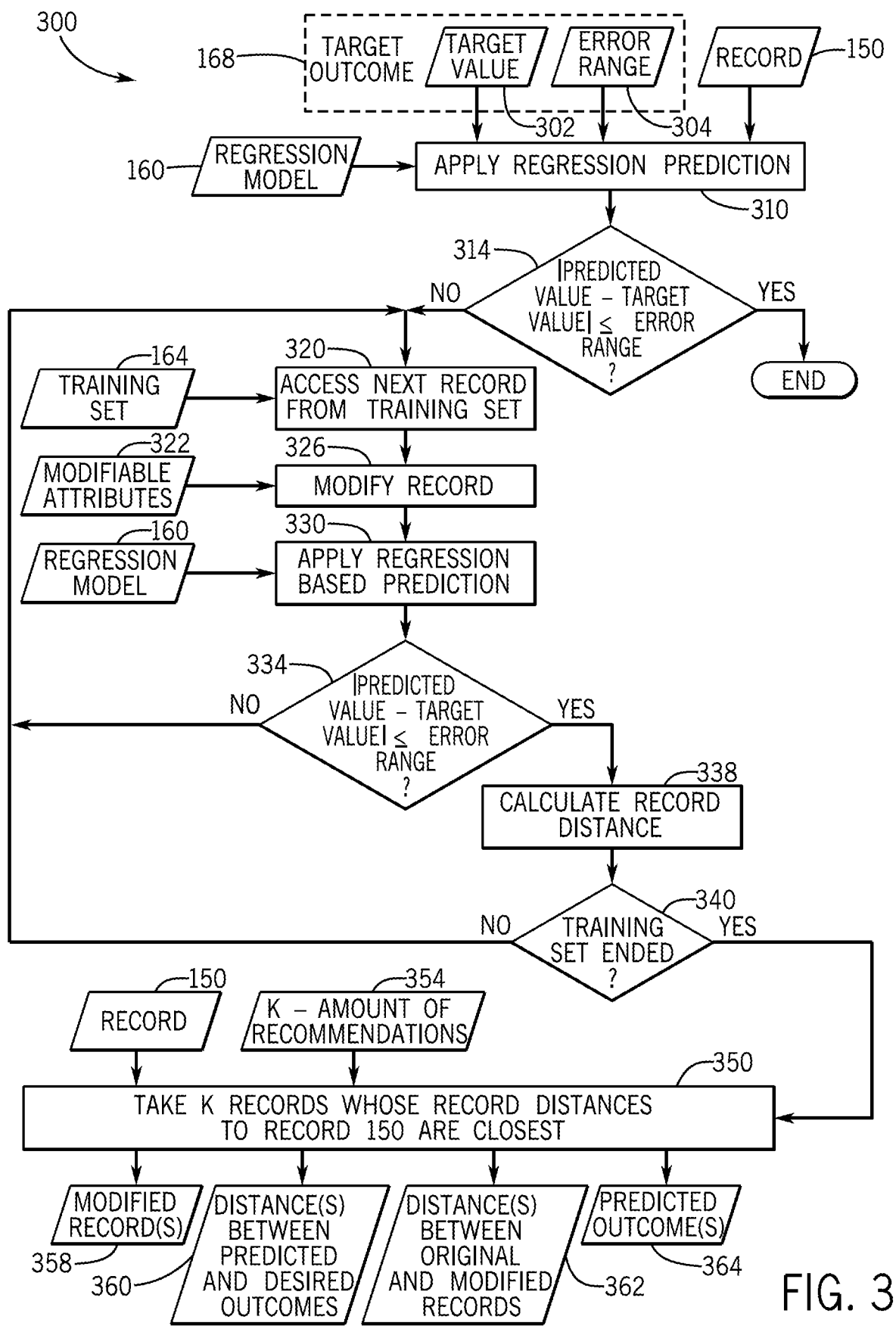

As a more specific example, in accordance with some example implementations, the system 100 may perform a technique 300 that is illustrated in FIG. 3. Referring to FIG. 3 in conjunction with FIG. 1, the system 100 applies (block 310) regression prediction based at least in part on the regression model 160, the target outcome 168 and the record 150. As shown in FIG. 3, the target outcome 168 may include a target value 302, as well as an error range 304, defining a range about the target value 302.

Based on the result of the regression prediction, the prediction engine 104 determines (decision block 314) whether the absolute value of the difference between the predicted value and the target value is less than or equal to the error range. If so, then the current record 150 and its associated values are sufficient, and the technique 300 terminates. Otherwise, prediction engine 104 accesses the next record from the training set 164, pursuant to block 320, and modifies (block 326), the records, as determined by data 322 indicating the attributes that may be modified.

Next, the prediction engine 104 applies (block 330) regression-based prediction based on the regression model 160 and determines (decision block 334) whether the absolute value of the difference between the predicted value and the target value is within the error range. If not, the prediction engine 104 discards the modified record 110, and control proceeds to block 320 to begin another iteration to produce another modified record 110. If, however, the prediction engine 104 determines (decision block 334) that the absolute value of the difference between the predicted and target values are within the error range, then the prediction engine 104 calculates a record distance, pursuant to block 338. In this manner, a "record distance" refers to a distance between attributes of the original record 150 and the modified record 110. Next, the prediction engine 104 determines (decision block 340) whether all of the training records have been processed. If not, control returns to block 320.

Otherwise, the reduced set of modified records has been produced, and the recommendation engine 130 ranks the remaining modified records for purposes of providing the recommendations 170. More specifically, in accordance with example implementations, the recommendation engine 130 receives user data 354, which designates a number "K" of recommendations. The recommendation engine 130 then determines (block 350) the "top K" records whose record distances to the record 150 are the closest. As illustrated in FIG. 3, in accordance with example implementations, the recommendations 170 include the selected modified records 110 of the set 120, the associated distance(s) between the predicted and target outcomes 360, the distance(s) between the original and modified records 362 and the predicted outcome(s) 364.

FIG. 4 is an illustration of recommendations 400 produced, where the record represents to a set of attributes related to a house search, and the outcome is a desired price or value. As shown in FIG. 4, the recommendations 400 may be formatted in a table having such columns as a ranked number column 410, a price column 412, a location column 414, a rooms column 416, a floors column 420, a size column 422, an outcome distance column 424 and a record distance column 426. As illustrated in FIG. 4, in accordance with some implementations, each row of the table corresponds to one of the modified records, and the records are ranked based on the record distances. In other words, the top row assigned number one corresponds to the modified record having the smallest record distance (i.e., the modified record that is the closest to the original record). The record distance refers to the degree of change between the original record 150 and the corresponding record shown in the table. It is noted that the highest ranked modified record may be associated with an outcome distance that is larger than a lower ranked modified record.

Figure 5:
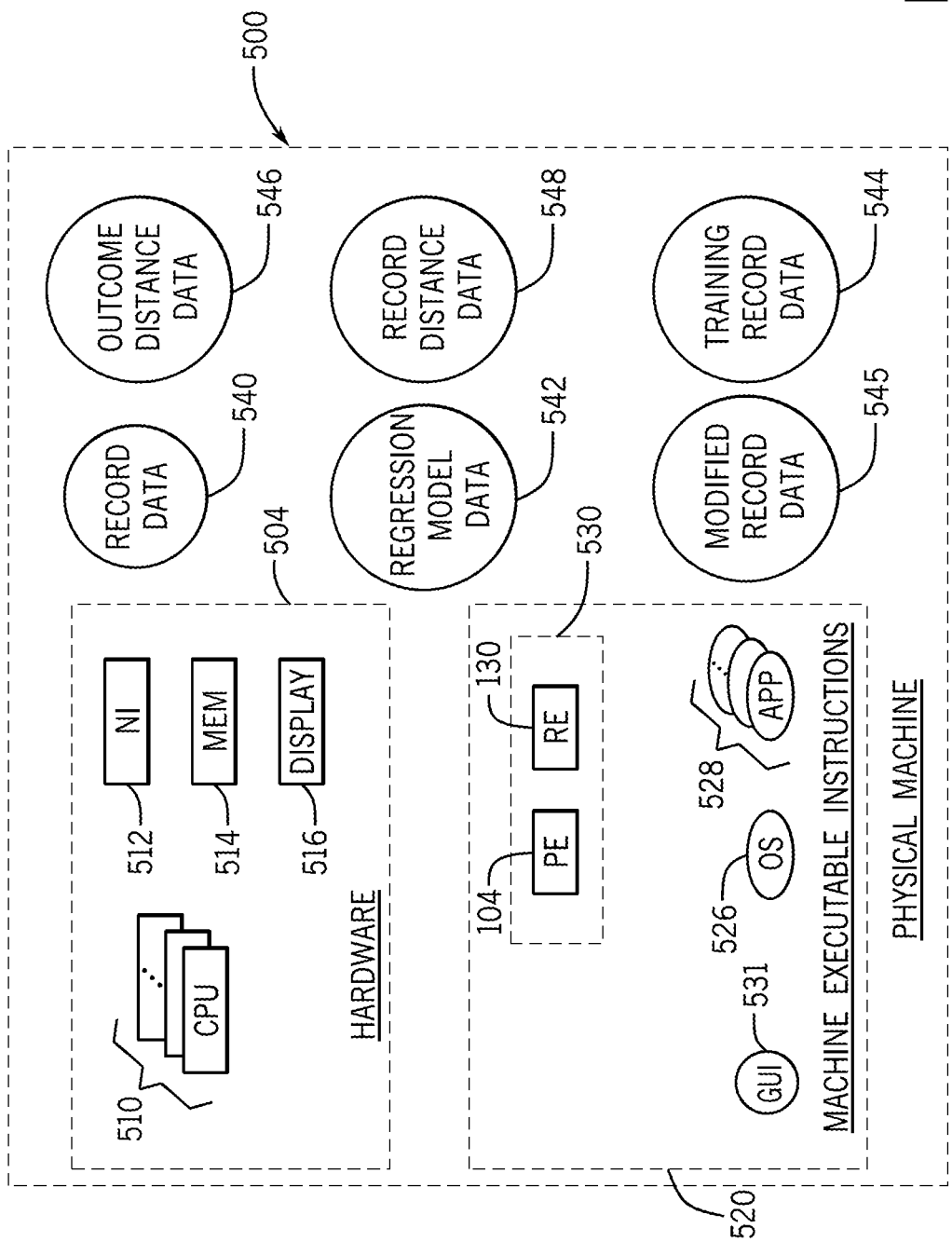
FIG. 5 is a schematic diagram of a physical machine according to an example implementation.

Referring to FIG. 5, in accordance with some implementations, the system 100 includes a physical machine 500. The physical machine 500 is an actual machine that is made up of actual hardware 504 and machine executable instructions 520, or "software."

The hardware 504 may include, for example, one or multiple central processing units (CPUs) 510, a memory 514, a network interface 512 and a display 516. Depending on the particular implementation, the processors 106, 126 and 132 (see FIG. 1) may be formed from one or multiple CPUs 510, one or multiple processing cores of the CPU(s) 510, and so forth. In general, the memory 514 may be a non-transitory storage medium that may store data, program instructions, data structures, and so forth, depending on the particular implementation. The memory 514 may be formed from semiconductor storage devices, phase change memory devices, magnetic storage devices, optical storage devices, memristors, and so forth, as well as one or more of these device types.

In accordance with example implementations, the memory 514 may store program instructions that when executed by the CPU(s) 510 cause the CPU(s) 510 to form one or more components 530 of the system 100.

Therefore, in accordance with example implementations, one or multiple components of the system 100 (the prediction engine 104, the filtering engine 125, the recommendation engine 130, and so forth, for example) may be software components, i.e., components formed by at least one processor executing machine executable instructions, or software. In further example implementations, one or multiple of the components 530 may be formed from dedicated hardware (one or more integrated circuits that contain logic configured to perform any of the functions of the components 530, as described herein). Thus, the components 530 may take on many different forms and may be based on software and/or hardware, depending on the particular implementation.

The memory 514 may store other data, in accordance with example implementations, such as data 540 representing the record 150; regression model data 542 representing parameters of the regression model 160; data 544 representing the training record set 164; data 545 representing the modified records 110; data 546 representing the outcome distances 360; data 548 representing the record distances 362; and so forth.

The machine executable instructions 520 may contain other instructions that are executed by one or multiple CPU(s) 510 for purposes of forming one or more additional software components, such as an operating system 526, one or multiple applications 528, and so forth.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method for modifying records stored in a database to produce a result within a target outcome, comprising:
    applying, by a processor, a regression model to a given record stored in a memory comprising a plurality of attributes to predict an outcome for the given record, the regression model being associated with and trained against a plurality of training records stored in the memory and the given record being associated with a target outcome; and
    based at least in part on the target outcome and the predicted outcome for the given record, selectively providing, by the processor, a recommendation to change the outcome for the given record, comprising:
    modifying, by the processor, the given record based at least in part on a first training record of the plurality of training records to provide a modified record;
    applying, by the processor, the regression model to the modified record to predict an outcome for the modified record;
    providing, by the processor, the recommendation to change the outcome for the given record based at least in part on the target outcome and the outcome for the modified record; and
    modifying, by the processor, the database to include the modified record detailing changes for producing a closest match to the target outcome based on non-modifiable attributes for the given record and modifiable records from the first training record.

2. The method of claim 1, wherein providing the recommendation to change comprises:
    determining, by the processor, a distance between the outcome for the modified record and the target outcome; and
    providing, by the processor, the recommendation to change based at least in part on the determined distance.

3. The method of claim 2, wherein the modified record comprises a given modified record of a plurality of records modified based on the plurality of training records, and providing the recommendation to change further comprises:
    ranking, by the processor, the given modified record among the plurality of records modified based on the plurality of training records based at least in part on the determined distance; and
    providing, by the processor, a recommended change based at least in part on the ranking.

4. The method of claim 1, wherein the modified record comprises a plurality of attributes, the method further comprising:
    determining, by the processor, a distance between the plurality of attributes of the modified record and the plurality of attributes of the given record.

5. The method of claim 1, wherein the target outcome comprises a value and an error range, and providing the recommendation to change further comprises providing, by the processor, a recommended change based at least in part on the error range.

6. The method of claim 1, further comprising displaying the recommendation to change the outcome for the given record based at least in part on the target outcome and the outcome for the modified record to a user.

7. The method of claim 1, wherein the target outcome is a home price value.

8. A system configured to modify records stored in a database to produce results within a target outcome, comprising:
    a processor configured to execute one or more instructions to:
    modify a first record based on a plurality of training records to provide a plurality of modified records, the plurality of training records being associated with a regression model, the regression model being trained against the plurality of training records and a target outcome being associated with the first record;
    apply the regression model to the plurality of modified records to provide outcomes for the modified records;
    filter the plurality of modified records based at least in part on a predetermined target outcome to provide a set of filtered records;
    rank the set of filtered records based at least in part on record distances between the set of filtered records and the first record; and
    modify the database to include the set of filtered records detailing changes for producing a closest match to the target outcome based on non-modifiable attributes for the first record and modifiable records from the plurality of training records.

9. The system of claim 8, wherein the processor is further configured to execute one or more instructions to select a predefined number of the set of filtered records based on the record distances.

10. The system of claim 9, wherein the processor is further configured to execute one or more instructions to determine a distance between an outcome of each of the predefined number of the set of filtered records and the target outcome.

11. The system of claim 8, wherein the first record comprises a plurality of attributes, each of the filtered plurality of modified records comprises a plurality of attributes, and a corresponding record distance comprises a distance between the plurality of attributes of the filtered record and the plurality of attributes of the first record.

12. The system of claim 8, wherein the target outcome comprises a target value and an associated error range associated with the target value.

13. The system of claim 12, wherein the processor is further configured to execute one or more instructions to determine, for each modified record, whether the target outcome for the modified record is within the associated error range and perform the filtering based at least in part on the determination for each modified record.

14. The system of claim 8, wherein the processor is further configured to execute one or more instructions to apply the regression model to the first record to determine an outcome for the first record, and determine whether the outcome for the first record is within a predefined error range of the target outcome.

15. The system of claim 8, wherein the target outcome is a home price value.

16. A non-transitory computer readable storage medium storing instructions for modifying records stored in a database to produce a result within a target outcome, that, when executed by a processor causes the processor to:
   modify a first record based on a plurality of training records to provide a plurality of modified records, the plurality of training records being associated with a regression model, the regression model being trained against the plurality of training records and a target outcome being associated with the first record;
   apply the regression model to the plurality of modified records to provide outcomes for the modified records;
   select a group of the modified records based at least in part of the outcomes for the modified records;
   provide a recommendation for the first record to change an outcome predicted for the first record by the regression model based at least in part on the target outcome and the outcomes for the modified records; and
   modify the database to include the group of modified records detailing changes for producing a closest match to the target outcome based on non-modifiable attributes for the first record and modifiable records from the plurality of training records.

17. The non-transitory computer readable storage medium of claim 16, wherein the processor is further caused to determine a record distance between the first record and each of the modified records and select a subset of modified records from the plurality of modified records based at least in part on the record distances.

18. The non-transitory computer readable storage medium of claim 17, wherein the processor is further caused to rank the subset of modified records based at least in part on the record distances.

19. The non-transitory computer readable storage medium of claim 16, wherein the target outcome is a home price value.

20. The non-transitory computer readable storage medium of claim 16, wherein the target outcome comprises a target value and an error range associated with the target value.

* * * * *